US011832562B2

(12) United States Patent
Redman

(10) Patent No.: US 11,832,562 B2
(45) Date of Patent: Dec. 5, 2023

(54) METHOD AND SYSTEM FOR PROVIDING NUTRIENTS TO A PLANT

(71) Applicant: Gordon Arthur Redman, Waddell, AZ (US)

(72) Inventor: Gordon Arthur Redman, Waddell, AZ (US)

(*) Notice: Subject to any disclaimer, the term of this patent is extended or adjusted under 35 U.S.C. 154(b) by 389 days.

(21) Appl. No.: 17/156,461

(22) Filed: Jan. 22, 2021

(65) Prior Publication Data

US 2021/0227761 A1 Jul. 29, 2021

Related U.S. Application Data

(60) Provisional application No. 62/965,795, filed on Jan. 24, 2020.

(51) Int. Cl.
| | | |
|---|---|---|
| A01G 27/00 | (2006.01) | |
| A01C 23/04 | (2006.01) | |
| B05B 12/14 | (2006.01) | |
| G05B 19/4155 | (2006.01) | |
| B05B 12/12 | (2006.01) | |

(52) U.S. Cl.
CPC .......... *A01G 27/003* (2013.01); *A01C 23/042* (2013.01); *A01G 27/001* (2013.01); *B05B 12/12* (2013.01); *B05B 12/1418* (2013.01); *G05B 19/4155* (2013.01); *G05B 2219/45013* (2013.01)

(58) Field of Classification Search
CPC .. A01G 27/001; A01G 27/003; A01G 27/005; A01C 23/042; B05B 1/30; B05B 7/32; B05B 9/0413; B05B 9/0416; B05B 12/12; B05B 12/1418; G05B 19/4155; G05B 2219/45013
See application file for complete search history.

(56) References Cited

U.S. PATENT DOCUMENTS

| | | | | |
|---|---|---|---|---|
| 9,586,180 | B2 * | 3/2017 | Bolton | B01D 61/364 |
| 10,434,480 | B2 * | 10/2019 | Mentzel | B01D 71/74 |
| 2019/0184344 | A1 * | 6/2019 | Mentzel | B01D 61/08 |

FOREIGN PATENT DOCUMENTS

| | | | | | |
|---|---|---|---|---|---|
| CN | 105502804 | A | * | 4/2016 | |
| CN | 104690066 | B | * | 9/2016 | |
| CN | 206323903 | U | * | 7/2017 | |
| CN | 207652978 | U | * | 7/2018 | |
| CN | 109197090 | A | * | 1/2019 | |
| CN | 110972668 | A | * | 4/2020 | ........... A01C 23/002 |
| CN | 110989704 | A | * | 4/2020 | ........... G05D 11/138 |
| CN | 210492024 | U | * | 5/2020 | |
| JP | H09266731 | A | * | 10/1997 | |
| KR | 100958580 | B1 | * | 5/2010 | |
| KR | 102192637 | B1 | * | 12/2020 | |
| RU | 2204895 | C2 | * | 5/2003 | |

* cited by examiner

*Primary Examiner* — Crystal J Barnes-Bullock
(74) *Attorney, Agent, or Firm* — Keith Miller Patent Law, PLLC; Keith Miller

(57) ABSTRACT

Methods and systems for providing nutrients to a plant are provided herein in which a feed solution containing water and solubilized nutrients are delivered to the plant at a desired ratio of concentration of water to fertilizer at each watering event in order to provide the plant with a consistent water to mineral ratio within their vascular system.

24 Claims, 3 Drawing Sheets

METHOD AND SYSTEM FOR PROVIDING NUTRIENTS TO A PLANT

CROSS-REFERENCE TO RELATED APPLICATION

The present application is related to and claims the benefit under 35 U.S.C. § 119(e) of the prior U.S. provisional application Ser. No. 62/965,795 filed Jan. 24, 2020 entitled "Method and System for Providing Nutrients to a Plant", the contents of which are incorporated herein by this reference in their entirety and are not admitted to be prior art with respect to the present invention by the mention in this cross-reference section.

FIELD OF THE INVENTION

The present invention relates to the field of plants. In particular, the present invention relates to methods and systems for feeding a plant to improve its quality and/or yield.

BACKGROUND OF THE INVENTION

Any discussion of prior art throughout the specification should in no way be considered as an admission that such prior art is widely known or forms part of the common general knowledge in the field.

Horticulture can be performed in a variety of environments using a variety of substrates such as in the field soil of a farm, a growing medium contained in a pot (e.g., within a greenhouse), or even in a soilless nutrient solution of a hydroponic system. Conventional growing practices typically utilize regular irrigation (e.g., delivery of water to the root zone via flood, drip, or sprinkler application) and less frequent "feedings" in which fertilizer is applied to the substrate in solid form and/or solubilized within water. For example, nutrients may generally be applied at several discrete intervals throughout the growing season, rather than at each irrigation event. Though it is recognized that the amount of water and nutrients provided to a plant plays a critical role in plant growth, it remains common practice to rely on "one size fits all" tables and charts for determining irrigation and/or fertilizer schedules that fail to optimize the delivery of water or nutrients to allow the plant to grow to its genetic potential.

Accordingly, there remains a need for improved horticultural methods and systems to maximize plant growth and/or promote commercially-viable production.

BRIEF SUMMARY OF THE INVENTION

According to the present invention there is provided an improved method and system for feeding a plant. Whereas conventional horticultural systems typically utilize frequent irrigation events (providing water only) and less frequent boluses of fertilizer at discrete times throughout a growing season, the system and method in accordance with the present invention provide a feed solution containing water and solubilized nutrients to the plant at a desired ratio of concentration of water to fertilizer at each watering event in order to provide the plant with a consistent water to mineral ratio within their vascular system. Without being bound by any particular theory, it is believed that consistently maintaining a proper ratio allows cells to thrive while allowing a proper electrical charge to go from one cell to another, thereby allowing the plant to more closely obtain its genetic potential.

In various embodiments, such a ratio can be determined from the electrical conductivity (EC) levels in the root zone of the plant. It has been found, for example, that soil EC levels tend to rise when the water content is reduced, and that EC levels tend to drop when the water content increases. As it may be unnecessary, burdensome, wasteful, or costly to continuously apply a feed solution to a plant at the target ratio to maintain the ideal ratio within the root zone at all times, the present method and system provide a feed solution at the target ratio to the plant during each feeding (separated by a non-feeding interval in which neither water nor fertilizer is intentionally applied to the plant), for example, until the substrate in the root zone is again at the target ratio (e.g., as indicated by a direct measurement of EC levels in the root zone or by measuring the EC levels in the runoff resulting from feeding). At this point, the current feeding may be stopped, and a new, non-feeding interval begun, such that the plant may be maintained in a sufficiently narrow range about the target ratio for a greater amount of time relative to less or more frequent fertilizer applications.

In various embodiments, when the initial indication of the water/fertilizer ratio after initiating the current feeding (e.g., after the substrate is moistened, the initial runoff from the substrate after initiating the feeding) is outside of a desired range around the target ratio, the frequency of feeding can be increased by reducing the non-feeding interval until the next application of the feed solution in order to address the deviation of the measured ratio from the target ratio resulting, for example, from the plant's current needs and/or environmental factors (e.g., the plant bringing in more water than fertilizer due to dry, hot conditions).

In an example embodiment, a method of providing nutrients to a plant is disclosed, the method comprising performing the following steps for each current feeding of a plurality of feedings: a) initiating the current feeding after a non-feeding interval by applying a feed solution to the plant, wherein the feed solution comprises water and fertilizer at a target ratio of concentration of water to fertilizer to be maintained in a root zone of a plant over the plurality of feedings; b) determining a ratio of concentration of water to fertilizer in the root zone during the current feeding; c) wherein, in an instance in which an initial determination of the ratio after initiating the current feeding is outside of a target range around the target ratio, reducing the non-feeding interval prior to the next feeding to be less than the non-feeding interval prior to the current feeding; and d) stopping the current feeding when the determined ratio is at about the target ratio.

In some embodiments, the method may further comprise determining the target ratio of concentration of water to fertilizer to be maintained in the root zone over the plurality of feedings (e.g., based on a prior knowledge of the plant's needs and/or growing conditions, through experimentation, or via instruction/selection by the user). In some embodiments, the method may additionally or alternatively comprise mixing fertilizer and water to form the feed solution at the target ratio and/or storing sufficient feed solution at the target ratio for more than one feeding at a feed solution source, wherein applying the feed solution to the plant comprises receiving the feed solution from the feed solution source.

The ratio of concentration to fertilizer in the root zone may be determined in a variety of ways. For example, in some embodiments, electrical conductivity (EC) levels may be measured or detected in order to determine the ratio of concentration of water to fertilizer in the root zone. Generally, electrical conductivity measures the ability of a material to conduct an electric current such that the EC of a substrate and/or solution is related to the amount of salts such as those found in fertilizers (e.g., dissolved salts comprising nitrogen, phosphorus, potassium, calcium, magnesium and similar elements). In this manner, the EC reading may be indicative of a loss of nutrients available to the plant or a decreased amount of water availability. In some example embodiments, the concentration ratio of water to fertilizer in the root zone may be determined based on a measurement of electrical conductivity in the root zone. Additionally, or alternatively, the concentration ratio of water to fertilizer in the root zone may be determined based on a measurement of electrical conductivity in runoff from the root zone.

As noted above, the current feeding may be stopped when the ratio of concentration of water to fertilizer in the root zone during the current feeding is at about the target ratio. By way of example, the current feeding may be stopped when the determined ratio within 5% of the target ratio (e.g., less than 5%, less than 4%, less than 3%, less than 2%, less than 1% deviation). In addition to terminating the current feeding upon reaching the target ratio in the root zone, some embodiments in accordance with various aspects of the present teachings provide that a target range around the target ratio may be used to determine if subsequent feedings (e.g., the next feeding) should occur more frequently.

In some embodiments, for example, in an instance in which the initial ratio after initiating the current feeding is outside of the target range, the non-feeding interval prior to the next feeding may be reduced to a value less than the non-feeding interval prior to the current feeding. In such embodiments, while the current feeding continues until the target range is achieved, the initial determination that the ratio is outside of the target range may indicate the necessity of increasing the frequency of feedings (e.g., reducing the non-feeding interval prior to the next feeding). A person skilled in the art will appreciate that the initial determination of the ratio after initiating the current feeding can be performed in a variety of ways. For example, the initial determination of the ratio may be performed only upon the substrate being moistened by the current feeding. Alternatively, the initial determination of the ratio may be determined from an initial quantity of runoff after initiating the current feeding (e.g., the first mL of runoff). Upon this initial determination, frequency of future feedings may be increased if the initial determination of the ratio after initiating the current feeding is greater than ±10 percent of the target ratio.

In some example embodiments, the target range may extend between about 400 ppm to about 600 ppm where the target ratio is 500 ppm. In some embodiments, the method may further comprise providing a warning if the initial determined ratio is outside of the target range, for example, to alert the user that the plant uptake has deviated outside the target range and/or to indicate a change in the feed schedule. In some embodiments, the determination of the ratio may be determined continuously during each feeding or may be sampled (e.g., every 5 seconds throughout the feeding).

While the above discussion of example methods in accordance with the present invention largely addresses increasing the frequency of feedings, in some embodiments, the method may also include decreasing the frequency of feedings in instances in which the current feeding schedule appears to consistently deliver at least the plant's needed water and fertilizer. By way of example, some embodiments may include increasing the non-feeding interval prior to the next feeding to be greater than the non-feeding interval prior to the current feeding in an instance in which the initial determination of the ratio is within the target range for a plurality of directly preceding feedings.

In one embodiment, a computerized method of providing nutrients to a plant is disclosed, comprising using a controller to perform a variety of steps for each current feeding of a plurality of feedings. Various steps may include applying a control signal to initiate the current feeding after a non-feeding interval by applying a feed solution to the plant, wherein the feed solution comprises water and fertilizer at a target ratio of concentration of water to fertilizer to be maintained in a root zone of a plant over the plurality of feedings, and receiving a sensor signal indicative of the ratio of concentration of water to fertilizer in the root zone during the current feeding. In an instance in which an initial determination of the ratio after initiating the current feeding is outside of a target range around the target ratio, the non-feeding interval prior to the next feeding may be reduced to be less than the non-feeding interval prior to the current feeding. A control signal may also be applied to stop the current feeding when the determined ratio is at about the target ratio. In some embodiments, the controller may be further configured to determine from the sensor signal the ratio of concentration of water to fertilizer in the root zone during the current feeding.

In another embodiment, a system for providing nutrients to a plant is disclosed, the system comprising a feed solution and feed solution source. In some embodiments, the feed solution source is a reservoir configured to contain the feed solution comprising water and fertilizer at a target ratio of concentration of water to fertilizer to be maintained in a root zone of a plant over a plurality of feedings separated by a non-feeding interval. In other embodiments, the feed solution source is comprised of a plurality of reservoirs where each reservoir is configured to contain a separate ingredient of the feed solution, such as one reservoir for water, a reservoir for fertilizer, etc.

The system also includes a feed solution delivery system for delivering a feed solution from the feed solution source to the root zone of the plant and a sensor configured to generate a sensor signal indicative of the ratio of concentration of water to fertilizer in the root zone during the current feeding. A controller may be configured to perform the following steps for each feeding over the plurality of feedings: apply a control signal to the feed solution delivery system to initiate the current feeding after the non-feeding interval by applying the feed solution to the plant; receive the sensor signal indicative of the ratio of concentration of water to fertilizer in the root zone during the current feeding; wherein, in an instance in which an initial determination of the ratio after initiating the current feeding is outside of a target range around the target ratio, reduce the non-feeding interval prior to the next feeding to be less than the non-feeding interval prior to the current feeding, and apply a control signal to the feed solution delivery system to stop the current feeding when the determined ratio is at about the target ratio.

In some embodiments, the controller may be further configured to determine from the sensor signal the ratio of concentration of water to fertilizer in the root zone during the current feeding. As noted above, in some embodiments, the initial determination of the ratio may be performed upon the substrate being moistened by the current feeding or from an initial quantity of runoff after initiating the current feeding (e.g., the first mL of runoff) and wherein the current feeding is stopped when the ratio determined from the runoff is at about the target ratio.

The feed solution delivery system can have a variety of configurations but is generally configured to deliver the feed solution to the root zone of the plant. In some embodiments, the feed solution delivery system can comprise, alone or in combination, one or more pumps, one or more valves, and one or more discharge members for discharging the feed solution into the root zone or onto a substrate within which the root zone is contained. By way of non-limiting example, the discharge member may comprise one or more of a dripper or a sprayer.

In some embodiments, the controller may be further configured to determine the ratio of concentration of water to fertilizer in the root zone based on a measurement of electrical conductivity in the root zone. Additionally, or alternatively, the controller may be further configured to determine the ratio of concentration of water to fertilizer in the root zone, which is determined by the controller based on a measurement of electrical conductivity or other means in runoff from the root zone.

These and other features of the invention are set forth herein.

BRIEF DESCRIPTION OF THE DRAWINGS

The preferred embodiment of the present invention will now be described, by way of example only, with reference to the accompanying drawings in which.

DETAILED DESCRIPTION OF THE INVENTION

Figure 1:
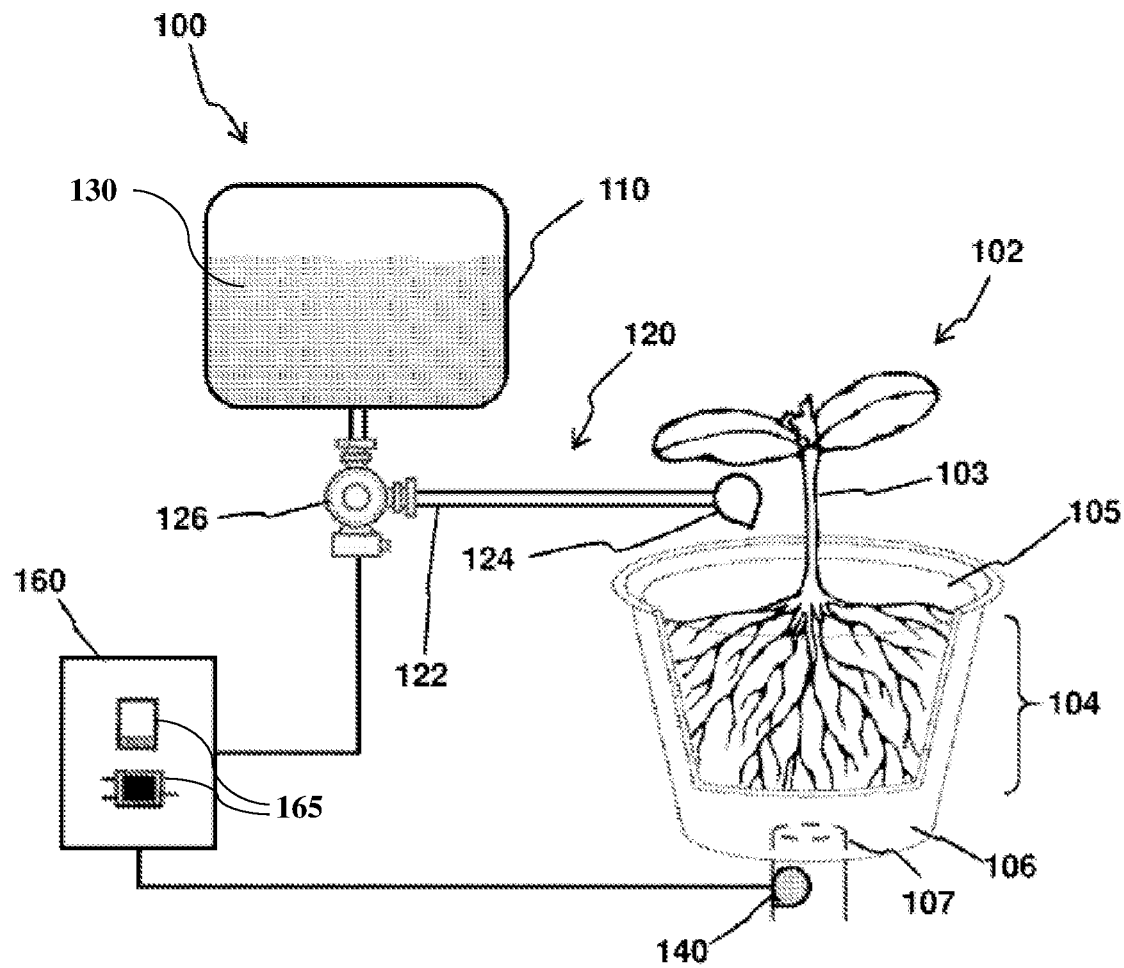
FIG. 1 shows a diagram for a System for Providing Nutrients to a Plant according to the present invention.

The foregoing and other objectives, features, and advantages of the invention will be more readily understood upon consideration of the following description of the invention taken in conjunction with the accompanying drawings.

It will be appreciated that for clarity, the following discussion will discuss various aspects of embodiments of the applicant's teachings, while omitting certain specific details wherever convenient or appropriate to do so. For example, discussion of like or analogous features in alternative embodiments may be somewhat abbreviated. Well-known ideas or concepts may also, for brevity, not be discussed in great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

The present invention discloses an improved method and system for feeding nutrients to a plant in which a feed solution containing water and solubilized nutrients are provided to the plant at a target ratio of concentration of water to fertilizer at each feeding event to allow the plant to more closely obtain its genetic potential. While almost impossible to continuously maintain an ideal ratio of water/fertilizer in the root zone (and perhaps being burdensome, wasteful, or costly), the present method and system addresses a plant's needs while maintaining the ratio in a sufficiently narrow range about the target ratio for a greater amount of time relative to less frequent fertilizer applications as conventionally applied.

As an example, a feed solution at the target concentration ratio may be applied to the plant during each feeding (separated by a non-feeding interval in which neither water nor fertilizer is intentionally applied to the plant) until the substrate in the root zone is again at the target concentration ratio. Moreover, in some embodiments, if after initiating the current feeding the initial indication of the water/fertilizer concentration ratio (e.g., after the substrate is moistened and before the root zone of the plant is again at the target ratio) is outside of a desired range around the target ratio, the frequency of feeding can be increased in order to address this significant deviation of the measured ratio from the target ratio. That is, while plant health and growth may not be significantly affected if the concentration ratio is within a target range around the target range (e.g., spanning slightly below to slightly above the target ratio), more substantial deviations may require additional feedings to make available the proper concentration ratio of water/nutrients. While the initial determination of the concentration ratio in the root zone should ideally match the target ratio (thereby indicating that the plant already had access to the target concentration ratio and was more likely to grow to its genetic potential), an initial determination that significantly differs from this target ratio (e.g., is outside of the target range) indicates that an adjustment to the feeding schedule is necessary to better provide the plant with the optimum concentration ratio of water to fertilizer.

Now referring to the drawings, FIG. 1 shows a diagram of a system 100 for feeding nutrients to a plant 102 in accordance with various embodiments of the present invention. The system 100 comprises a feed solution 130, a feed solution source 110, a feed solution delivery system 120, a sensor 140, and a controller 160. The controller 160 is in communication with the feed delivery system 120 and the sensor 140 for controlling the operation of the methods and systems as discussed in detail below.

As further shown in FIG. 1, the plant 102 is growing within a substrate 105 disposed within a container 106. The plant 102 comprises a stem 103 extending upward from the substrate 105 and a root zone 104 within the substrate 105. Though only a single plant 102 is depicted as growing within container 106, it will be appreciated that the present invention is equally applicable to a plurality of plants growing in a container, for example, in a shared substrate. Moreover, though FIG. 1 depicts the plant 102 planted in substrate 105 within the container 106, it will be appreciated that the system can be used in a variety of indoor or outdoor environments and with a variety of substrates (e.g., growing media, soil, hydroponic solution). By way of non-limiting example, methods and systems in accordance with the present teachings can be applied to one or more plants planted in a substrate contained in a pot, in the soil of a field, or in a soilless nutrient solution of a hydroponic system.

The feed solution source 110 may be a reservoir that can have a variety of configurations but is generally configured to contain a feed solution 130, the feed solution 130 comprising water and fertilizer at a target ratio of concentration of water to fertilizer. The feed solution source 110 is fluidly coupled to the feed solution delivery system 120 to provide the feed solution 130 to the plant 102. As shown in FIG. 1, the feed solution source 110 is preferably a rectangular cubical shape with an opening on a top surface to fill the feed solution source 110 with feed solution 130. However, other shapes and configurations of the feed solution source 110 not enumerated herein can be considered.

The feed solution delivery system 120 is generally configured to apply feed solution received from the feed solution source 110 to the plant 102 according to a predetermined schedule as otherwise discussed herein. As shown in FIG. 1, for example, the feed solution delivery system 120 can comprise one or more fluid conduits 122 (e.g., pipes, tubes, hoses) extending from a bottom portion of the feed solution source 110 to the application device 124.

The feed solution delivery system 120 may comprise a gravity feed system, a pressurized feed solution source, or other type of delivery systems not specifically outlined herein.

Though the application device 124 is depicted as a dripper for dripping the feed solution 130 onto the substrate surface, it will be appreciated that any known application devices for applying feed solution to the substrate 105 are suitable according to the present invention. By way of non-limiting example, the application device 124 can any of a dripper, a sprayer, a sprinkler, an irrigation drip line, a manifold, etc. for delivering feed solution 130 to the surface of the substrate 105 such that the feed solution 130 can permeate or percolate through the substrate 105 to the root zone 104 for uptake by the plant 102. Additionally, the feed solution delivery system 120 may be configured to directly deliver feed solution 130 below the surface of the substrate (e.g., through a buried irrigation line) or through flood irrigation.

As further shown in FIG. 1, the feed solution delivery system 120 may further comprise one or more pumps and/or valves 126 operatively coupled to the controller 160 for controlling the flow of feed solution 130 from the reservoir 110 to the application device 124. It will be appreciated that any known pumps and/or valves known in the art and modified may be used in the system 100 of FIG. 1. By way of non-limiting examples, the pump may be a centrifugal pump, a metering pump, a dosing pump, a submersible pump, or a recirculation pump and the valve may be a solenoid valve, a dosing valve, an irrigation valve, a sprinkler valve, which can selectively allow the delivery of food solution according to a control signal provided by the controller 160.

As further shown in FIG. 1, the container 106 includes a drain hole 107 through which feed solution that is not absorbed and/or retained by the substrate 105 can exit from the container 107 as runoff. In one embodiment, the sensor 140 can be disposed within the runoff (e.g., under the drain hole 107, within a runoff collecting tray) such that the sensor can directly or indirectly detect the concentration of water to fertilizer in the root zone 104 of the plant. Suitable sensors for use in accordance with the present teachings can have a variety of configurations, such as a detector for generating a signal indicative of the water content and/or electrical conductivity (EC) of the runoff by analyzing the runoff's temperature, resistance, and/or capacitance in order to infer the relative concentration of water and fertilizer as the conductivity reflects the ionic content (e.g., dissolved salts comprising nitrogen, phosphorus, potassium, calcium, magnesium and similar elements) of the runoff. Although electrical conductivity is used as an example herein, other types of measurement systems may be contemplated, such as spectroscopy among others.

In one embodiment, the sensor 140 can determine the EC level directly or can transmit a sensor signal to the controller 160 for analysis thereby. As discussed otherwise herein, the EC may indicate of a loss or abundance of nutrients available to the plant or a decreased amount of water available to the plant. In some example embodiments, the ratio of concentration of water to fertilizer in the root zone may be determined based on a measurement of electrical conductivity in the root zone. Additionally, or alternatively, the ratio of concentration of water to fertilizer in the root zone may be determined based on a measurement of electrical conductivity in runoff from the root zone.

In one embodiment, the system 100 may further comprise a controller 160 that can enable the automated monitoring and/or control of the system 100 for providing nutrients to a plant. As shown in FIG. 1, the controller 160 can be in wired or wireless communication with the pumps and/or valves 126 of the feed solution delivery system 120 and/or the sensor 140 to adjust the feeding schedule as otherwise discussed herein to maintain the ratio of the concentration of water to fertilizer in the root zone 104 of the plant 102 in a sufficiently narrow range about a target ratio to improve the growth and/or yield of the plant.

In another embodiment, the controller 160 can control the feed solution delivery system 120 such that the feed solution 130, contained within the reservoir 110 at the target ratio, can be delivered to the plant 102 at a plurality of feedings, each of which may be separated by a non-feeding interval in which neither water nor fertilizer is intentionally applied to the plant. During each feeding, the sensor 140 of FIG. 1 may detect the EC of the runoff until the sensor 140 or controller 160 determines that the runoff is at about the target ratio (e.g., ±5%, ±2%, ±1%) at which time the controller 160 may send a control signal to the feed delivery system 120 to terminate the current feeding. In this manner, the length/volume of each feeding need not be predetermined, but instead the feeding may occur until it is indicated that the concentration of water and fertilizer at the root zone 104 are at about the target ratio. In another embodiment, the sensor 140 can continuously monitor the EC level of the runoff during the feeding, or alternatively, may sample the runoff at pre-determined intervals during the current feeding. For example, the sensor 140 may be configured to sample the runoff during the current feeding every 10 seconds, every 5 seconds, every 4 seconds, every 3 seconds, every 2 seconds, or every 1 second.

In addition to terminating the current feeding based on the signal received from the sensor 140 as discussed above, the controller 160 may also adjust the feeding schedule (e.g., by changing the length of time of the non-feeding interval before the next feeding) to account for any large deviations indicated by the detected ratio during the current feeding. For example, if the EC level in the initial runoff (e.g., the initial volume of runoff after the feed solution 130 applied to the upper surface of substrate 105 permeates through) substantially deviates from the target concentration ratio, the controller 160 can decrease the non-feeding interval following the current feeding to help ensure that the plant 102 has continued access the appropriate concentration of water/fertilizer. That is, the significant deviation in the concentration at the beginning of the current feeding suggests that the plant's growth was outside of a preferred, target range for optimal plant growth during a significant portion of the directly preceding non-feeding interval. While it is within the scope of the present invention to adjust the feeding schedule based on any deviation from about the target ratio during the initial determination, it may be preferable to decrease the non-feeding interval only upon more substantial deviations from the target ratio being detected. For example, it has been observed that plant growth and health is not substantially affected if the initially determined ratio is within a target range (e.g., ±20%, 15%, 10%) around the target ratio such that a threshold may be set prior to adjusting the feeding schedule. Accordingly, in some embodiments, the controller 160 may, based on the initial determination of the EC in the runoff, decrease the non-feeding interval prior to the next feeding if the initial determination is beyond the threshold (i.e., is outside of a target range around the target ratio).

It will be appreciated that the change in the non-feeding interval and/or frequency of feedings can be determined in a variety of manners. In some embodiments, the reduction of the non-feeding interval can be based on the deviation of the initial concentration from the target range. That is, a larger deviation of the initial concentration from the target ratio may indicate the need for a greater reduction in the following non-feeding interval. In an alternate embodiment, the reduction of the non-feeding interval can be based on the current number of feedings over a fixed interval according to the non-feeding interval. For example, if the non-feeding interval prior to the current feeding is 8 hours (which would be 3 feedings/day) and the initial concentration were outside the target range, the frequency of feeding could increase to 4 feedings/day (i.e., a 6 hour non-feeding interval).

While the above description has focused on reducing deviation from the target ratio by decreasing the non-feeding interval, in some embodiments, the controller 160 may be configured to increase the non-feeding interval to account for changing growing conditions (e.g., decreased need for both water and fertilizer). For example, if the initial determination of the concentration ratio for the current feeding and a plurality of directly preceding feedings are within the target range, the controller 160 may increase the non-feeding interval to conserve resources. If, however, subsequent feedings indicate a deficiency in the feeding schedule, the non-feeding interval can again be adjusted as otherwise discussed herein.

In some embodiments, the controller 160 may be configured to communicate with and/or control operation of various components of the system 100. As described otherwise herein, the controller 160 may provide logic and control functionality used during utilization of the various modules 165 and/or systems of the system 100. For example, the controller 160 may include one or more modules 165 that are configured to perform various functions of the system 100. As shown in FIG. 1, the controller 160 may include a concentration ratio module for calculating the concentration ratio based on signals received from the sensor 140, a scheduling module for determining the next non-feeding interval, etc. Though described as distinct modules 165, some modules may be configured to share functionality. Likewise, various combinations of functionality are contemplated across the various modules 165.

The controller 160 and/or its various modules 165 may comprise (or be connected to) hardware and software to enable performance of various functions described herein. Along these lines, the modules 165 may share functionality across distinct hardware (e.g., among various servers, controllers, various systems described herein including in different locations and/or different apparatuses). The controller 160 may comprise one or more suitable electronic device(s)/server(s) capable of executing described functionality via hardware and/or software control.

In some embodiments, the controller 160 may include one or more user interfaces (not shown), such as for displaying information and/or accepting instructions, for example, regarding the target ratio (e.g., as input by a user). The controller 160 may be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 160 may include one or more processors coupled to a memory device, controller 160 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, a controller may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (Hypertext Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In some embodiments, the controller 160 may be configured to execute computer program code instructions to perform functions of various embodiments of the present invention described herein.

In some embodiments described herein, various components (e.g., modules, systems, architectures) of the system 100 may be configured to determine various things. As used herein, "determine" is not meant to be limiting and may include, for example, determining a selection, determining something from one or more instructions, generating something.

Figure 2:
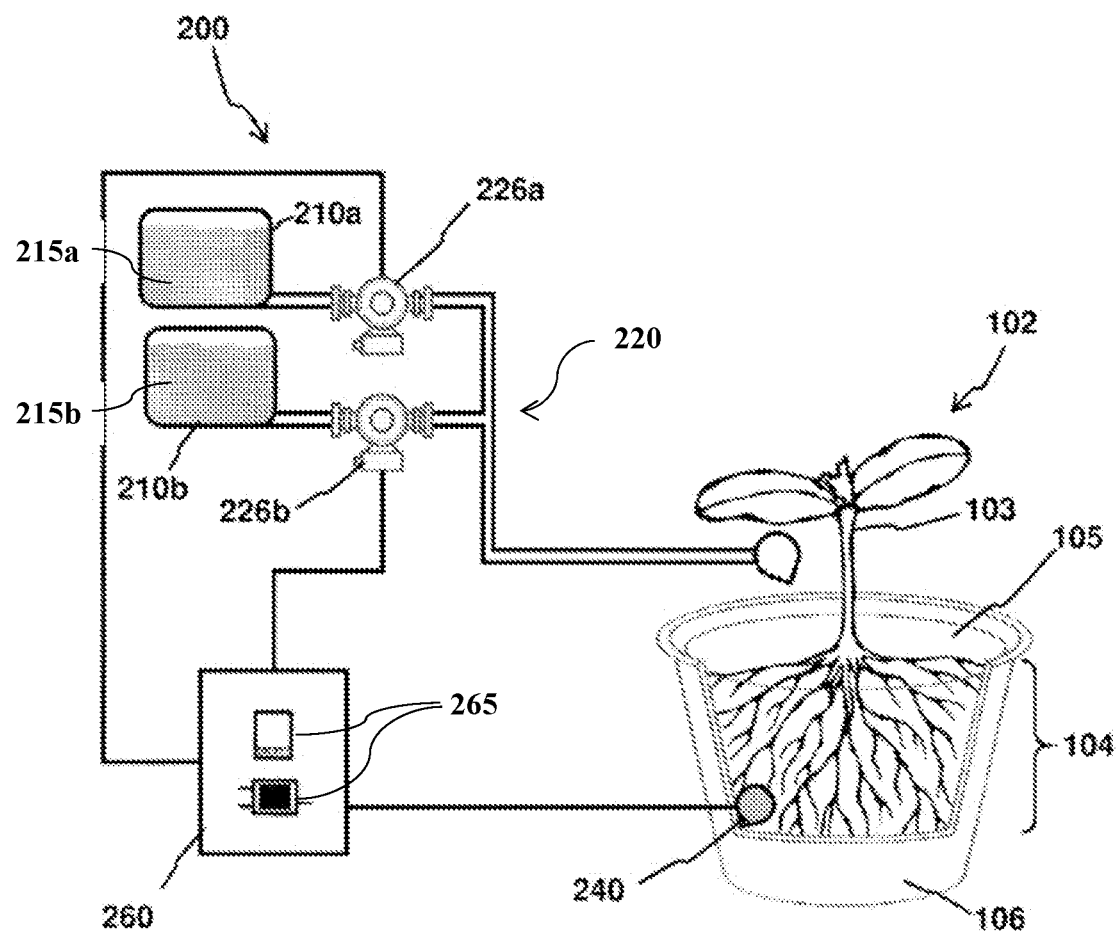
FIG. 2 shows a diagram for a System for Providing Nutrients to a Plant according to an alternate embodiment of the present invention.

Now referring to FIG. 2, an alternate embodiment of the system 200 for feeding a plant 102 is shown. In this embodiment, the sensor 240 providing a signal indicative of the concentration of water to fertilizer in the root zone 104 of the plant is disposed within the substrate 105. Thus, in this embodiment, the sensor 240 may sense the EC within the substrate itself. In this embodiment, the initial determination of the concentration ratio may occur after a certain time after initiating the feeding (e.g., after 10 seconds, after 5 seconds) or upon the sensor being wetted in light of the time required for the feed solution to permeate through the substrate 105.

As further shown in FIG. 2, the feed solution is mixed from a plurality of feed solution sources, where the feed solution delivery system 220 mixes water 215a from a first feed solution source 210a along with the fertilizer 215b from a second feed solution source 210b at the target ratio on demand. In this embodiment, the mixing of the water and fertilizer at the target ratio is based on the control of the speed, or dosing capabilities, of the respective pumps 226a, b via the controller 260. In this embodiment, as outlined above, the plurality of feed solution sources may be a plurality of reservoirs each configured to contain the water and nutrients, or any other ingredients needed to make up the feed solution.

In this embodiment shown in FIG. 2, the feed solution delivery system 220 may comprise proportioning equipment or proportioners. Proportioners are configured to accurately dilute concentrated chemicals or substances to a specific predetermined ratio of water to nutrients. In another embodiment, the nutrients may be added to the water using a venturi injection system, where the water pressure in the feed solution delivery system draws and blends the nutrients from a second feed solution source into the water running through the feed solution delivery system 220.

As further shown in FIG. 2, the controller 260 may also comprise one or more modules 265 that are configured to perform various functions of the system 200 as explained above in reference to FIG. 1.

Figure 3:
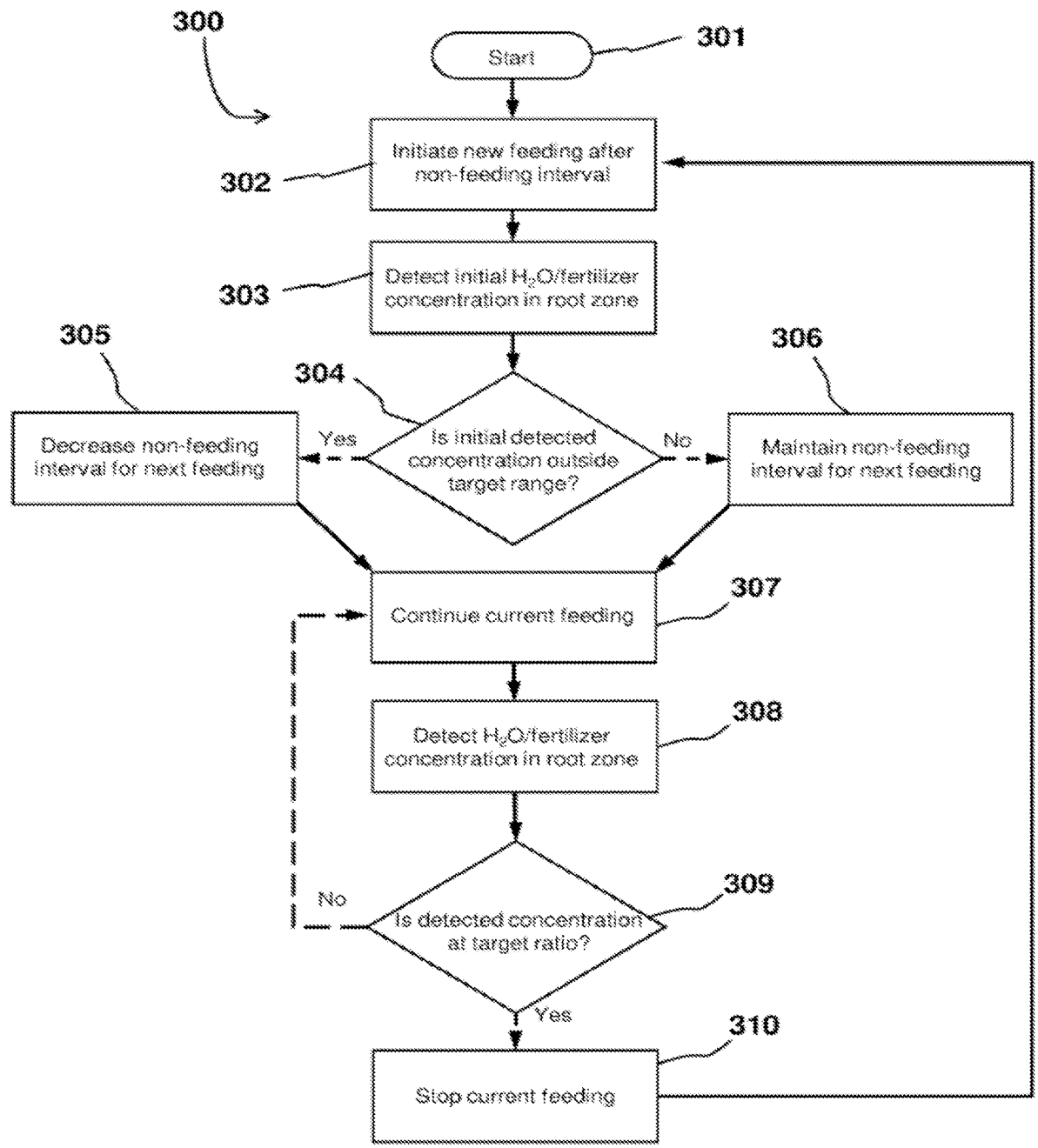
FIG. 3 shows a flow chart of a Method for Providing Nutrients to a Plant according to the present invention.

With reference now to FIG. 3, a flowchart is shown for a method 300 of providing nutrients to a plant according to the present invention. At the start 301, the target ratio of concentration of water to fertilizer may be determined for a plurality of feedings, and may for example, be based on prior knowledge of the plant's needs and/or growing conditions, through experimentation, or via instruction/selection by the user. In addition, a sufficient quantity of the feed solution may be mixed to be applied over one or more feedings.

At step 302, which occurs after a non-feeding interval, a current feeding can be initiated by delivering to the plant the feed solution at the target ratio. Thereafter, the initial concentration ratio in the root zone after initiating the current feeding can be determined in step 303, which can be used to adjust the feeding schedule in step 304, if necessary, to obtain more optimal growing conditions for the plant. As noted above, for example, if it is determined at step 304 of the current feeding that the initial concentration is outside of a target range (e.g., ±10% around the target ratio), the non-feeding interval prior to the next feeding may be decreased as shown in step 305. If, however, the initial determined concentration is within the target range around the target ratio as shown in step 306, the same non-feeding interval may also be used for the next feeding. In any event, at step 307, the current feeding continues through continued delivery of the feed solution while the concentration ratio is monitored in step 308. If the determined target ratio has not yet achieved the target range (or thereabouts, e.g., within ±5%) as determined at step 309, the current feeding continues. However, upon determining that the target ratio has been achieved in the root zone, the current feeding is terminated by stopping the application of the feeding solution as in step 310. After waiting the non-feeding interval determined in the previous steps 305 or 306, the newly current feeding is initiated at step 302.

An example operation of the method of FIG. 3 for a series of five feedings (A1-A5) is depicted below in Table 1, with the target ratio being 500 ppm and the target range being 400-600 ppm.

| | A1 | A2 | A3 | A4 | A5 |
|---|---|---|---|---|---|
| Preceding non-feeding interval | 12 hours | 12 hours | 8 hours | 6 hours | 6 hours |
| Initial PPM | 550 | 675 | 625 | 575 | 525 |
| Ending PPM | 500 ± 1% | 500 ± 1% | 500 ± 1% | 500 ± 1% | 500 ± 1% |
| Feed Duration | 60 seconds | 120 seconds | 90 seconds | 75 seconds | 60 seconds |
| Following non-feeding interval | 12 hours | 8 hours | 6 hours | 6 hours | 6 hours |

As shown in the table above, feeding A1 was initiated after a 12-hour non-feeding interval, and the initial conductivity measurement indicated a concentration ratio of 500 parts per million of fertilizer to water. As this is within the target range for this example (i.e., 500 ppm±20%), the non-feeding interval between A1 and A2 would remain the same as the non-feeding interval prior to feeding A1. Feeding A1 continued after this initial determination and lasted 60 seconds total, until the concentration ratio was detected to be at or about the target ratio (i.e., 500 ppm±1%).

Feeding A2 began 12 hours after feeding A1, as determined based on the initial concentration ratio obtained during feeding A1. However, the initial concentration ratio of 675 ppm during feeding A2 indicates that the non-feeding interval between A2 and A3 should decrease. Feeding A2 lasted 120 seconds total, until the concentration ratio was detected to be at or about the target ratio (i.e., 500 ppm±1%).

Feeding A3 began 8 hours after feeding A2, as determined based on the initial concentration ratio obtained during feeding A2. The initial concentration ratio of 625 ppm during feeding A3 was less than the initial deviation during feeding A2 but still outside of the target range such that the next non-feeding interval is again decreased. Feeding A3 lasted 90 seconds total until the target ratio was reached (i.e., 500 ppm±1%).

Feeding A4 began 6 hours after feeding A3 (as determined during A3). The initial concentration ratio of 575 ppm during feeding A4 was within the target range such that the non-feeding interval between A4 and A5 would remain the same as the non-feeding interval prior to feeding A4. Feeding A4 lasted 75 seconds total until the target ratio was reached (i.e., 500 ppm±1%).

Feeding A5 began 6 hours after feeding A4 (as determined during A4). The initial concentration ratio of 525 ppm during feeding A4 was within the target range such that the non-feeding interval between A4 and A5 would remain the same as the non-feeding interval after feeding A5 would remain unchanged relative to before feeding A5. Feeding A5 lasted 60 seconds total until the target ratio was reached (i.e., 500 ppm±1%).

Although the present invention has been described by way of example, it should be appreciated that variations and modifications may be made without departing from the scope of the invention. Furthermore, where known equivalents exist to specific features, such equivalents are incorporated as if specifically referred to in this specification.

What is claimed is:

1. A method of providing nutrients to a plant, comprising: for each current feeding of a plurality of feedings, performing the following steps:
    initiating a current feeding after a non-feeding interval by applying a feed solution to the plant, wherein the feed solution comprises water and fertilizer at a target ratio of concentration of water to fertilizer to be maintained in a root zone of a plant over the plurality of feedings;

determining a ratio of concentration of water to fertilizer in the root zone during the current feeding,
adjusting the non-feeding interval prior to the next feeding based on the ratio of concentration of water to fertilizer; and
stopping the current feeding when the determined ratio is at about the target ratio.

2. The method of claim 1, further comprising determining the target ratio of concentration of water to fertilizer to be maintained in the root zone over the plurality of feedings.

3. The method of claim 2, further comprising mixing the feed solution at the target ratio.

4. The method of claim 3, further comprising storing sufficient feed solution at the target ratio for more than one feeding at a feed solution source, and wherein applying the feed solution to the plant comprises receiving the feed solution from the feed solution source.

5. The method of claim 1, wherein the ratio of concentration of water to fertilizer in the root zone is determined based on a measurement of electrical conductivity.

6. The method of claim 1, wherein the ratio of concentration to fertilizer in the root zone is determined based on a measurement of electrical conductivity in runoff from the root zone.

7. The method of claim 1, wherein the current feeding is stopped when the determined ratio is within a target range.

8. The method of claim 1, wherein the target range comprises ±20 percent of the target ratio.

9. The method of claim 1, wherein the ratio of concentration of water to fertilizer in the root zone is determined using spectroscopy.

10. The method of claim 1, further comprising providing a warning if the determined ratio is outside of the target range.

11. The method of claim 1, further comprising increasing the non-feeding interval prior to the next feeding to be greater than the non-feeding interval prior to the current feeding if, for a plurality of directly preceding feedings, the initial determination of the ratio is within the target range.

12. The method of claim 1, wherein the ratio is determined continuously during each current feeding.

13. The method of claim 1, wherein the initial determination of the ratio is performed upon the substrate being moistened by the current feeding.

14. The method of claim 1, wherein the initial determination of the ratio is determined from an initial quantity of runoff after initiating the current feeding and wherein the current feeding is stopped when the ratio of water to fertilizer determined from the runoff is at about the target ratio.

15. A computerized method of providing nutrients to a plant, comprising:
using a controller to perform the following steps for each current feeding of a plurality of feedings:
applying a control signal to initiate the current feeding after a non-feeding interval by applying a feed solution to the plant, wherein the feed solution comprises water and fertilizer at a target ratio of concentration of water to fertilizer to be maintained in a root zone of a plant over the plurality of feedings;
receiving a sensor signal indicative of the ratio of concentration of water to fertilizer in the root zone during the current feeding,
adjusting the non-feeding interval prior to the next feeding based on the ratio of concentration of water to fertilizer, and
applying a control signal to stop the current feeding when the determined ratio is at about the target ratio.

16. The method of claim 15, wherein the controller is further configured to determine from the sensor signal the ratio of concentration of water to fertilizer in the root zone during the current feeding.

17. A system for providing nutrients to a plant, comprising:
a feed solution comprising water and fertilizer at a target ratio of concentration of water to fertilizer to be maintained in a root zone of a plant over the plurality of feedings separated by a non-feeding interval;
a feed solution source;
a feed solution delivery system for delivering the feed solution from the feed solution source to the root zone of the plant;
a sensor configured to generate a sensor signal indicative of the ratio of concentration of water to fertilizer in the root zone during a current feeding; and
a controller configured to perform the following steps for each feeding over a plurality of feedings:
apply a control signal to the feed solution delivery system to initiate the current feeding after the non-feeding interval by applying the feed solution to the plant;
receive the sensor signal indicative of the ratio of concentration of water to fertilizer in the root zone during the current feeding,
adjust the non-feeding interval prior to the next feeding based on the ratio of concentration of water to fertilizer, and
apply a control signal to the feed solution delivery system to stop the current feeding when the determined ratio is at about the target ratio.

18. The system of claim 17, wherein the controller is further configured to determine from the sensor signal the ratio of concentration of water to fertilizer in the root zone during the current feeding.

19. The system of claim 17, wherein the feed solution source is a reservoir configured to contain the feed solution.

20. The system of claim 17, wherein the feed solution delivery system comprises:
a pump;
a valve; and
an application device configured to apply the feed solution into the root zone or onto a substrate within which the root zone is contained, wherein the application device comprises one or more of a dripper or a sprayer.

21. The system of claim 17, wherein the ratio of concentration of water to fertilizer in the root zone is determined by the controller based on a measurement of electrical conductivity in the root zone.

22. The system of claim 17, wherein the ratio of concentration of water to fertilizer in the root zone is determined by the controller based on a measurement of electrical conductivity in runoff from the root zone.

23. The system of claim 17, wherein the initial determination of the ratio is performed upon the substrate being moistened by the current feeding.

24. The system of claim 17, wherein the initial determination of the ratio is determined from an initial quantity of runoff after initiating the current feeding and wherein the current feeding is stopped when the ratio determined from the runoff is at about the target ratio.

* * * * *